United States Patent
Otsuki

(10) Patent No.: US 8,717,714 B2
(45) Date of Patent: May 6, 2014

(54) MAGNETIC HEAD POSITIONING AND DRIVING DEVICE INCLUDING HEATERS AND DIODES

(75) Inventor: Haruaki Otsuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/983,869

(22) PCT Filed: Mar. 7, 2011

(86) PCT No.: PCT/JP2011/055236
§ 371 (c)(1),
(2), (4) Date: Aug. 6, 2013

(87) PCT Pub. No.: WO2012/120621
PCT Pub. Date: Sep. 13, 2012

(65) Prior Publication Data
US 2013/0314817 A1    Nov. 28, 2013

(51) Int. Cl.
*G11B 5/60*    (2006.01)
*G11B 21/24*   (2006.01)

(52) U.S. Cl.
USPC ............... 360/294.7; 360/125.31; 360/234.5

(58) Field of Classification Search
USPC ............. 360/125.31, 125.32, 125.74, 125.75, 360/234.4, 234.5, 294.7
See application file for complete search history.

(56) References Cited

U.S. PATENT DOCUMENTS

| | | | | |
|---|---|---|---|---|
| 8,289,659 B1* | 10/2012 | Bain et al. | ................... | 360/294.3 |
| 2004/0081030 A1* | 4/2004 | Jang et al. | ................... | 369/13.17 |
| 2005/0213250 A1* | 9/2005 | Kurita et al. | ............... | 360/234.4 |
| 2011/0096435 A1* | 4/2011 | Sasaki et al. | ............. | 360/114.01 |
| 2012/0300334 A1* | 11/2012 | Hsiao et al. | ...................... | 360/59 |

FOREIGN PATENT DOCUMENTS

| JP | 2006-164414 A | 6/2006 |
|---|---|---|
| JP | 2009-170014 A | 7/2009 |

* cited by examiner

*Primary Examiner* — Jefferson Evans
(74) *Attorney, Agent, or Firm* — Mattingly & Malur, PC

(57) ABSTRACT

In a positioning and driving system including a rotating magnetic disk, a magnetic head slider that floats above the surface of the magnetic disk and writes data to and reads data from a track provided on the magnetic disk, an actuator that positions the magnetic head slider in a radial direction of the magnetic disk, and an amplifier that supplies electrical power to the actuator in accordance with the input signal and performs a driving operation, provided is the configuration of an electrothermal actuator driving system that obtains continuous displacement over the entire required operating range with respect to changes in an input voltage by using only one amplifier and that is incorporated into a feedback control system and is suitable for high-speed and high-precision positioning.

5 Claims, 4 Drawing Sheets

MAGNETIC HEAD POSITIONING AND DRIVING DEVICE INCLUDING HEATERS AND DIODES

TECHNICAL FIELD

The present invention relates to a device that detects and feeds back the position of an object to be positioned to drive an actuator on the basis of comparison with a target position to position the object to be positioned at the target position, and particularly, to the configuration of a driving system of an electrothermal actuator in which a resistor is formed at the position of a slider on which a magnetic head is mounted, which is extremely close to the magnetic head, the balance between the heat generation produced by energizing this resistor and the heat dissipation by heat transfer to the surrounding environment is controlled, and a member in the vicinity of the resistor expands or contracts to displace the object to be positioned.

BACKGROUND ART

As background art of the present technical field, there is a JP-A-2009-170014 (PTL 1). In order to minutely position a recording and reproducing element that faces the surface of a recording medium in a magnetic disk apparatus to record and reproduce information, the configuration of a magnetic head slider in which a pair of electrothermal actuators are arranged via a thermal expansion member on both sides of the recording and reproducing element in a width direction of tracks is described in paragraphs 0077 to 0081 and FIGS. 6 and 7 of this publication. Additionally, the configuration of a control system that controls the driving of the pair of electrothermal actuators and a voice coil motor and positions the recording and reproducing element is described in paragraphs 0082 to 0091 and FIG. 8 of this publication.

On the other hand, as other background art of the present technical field, there is a JP-A-2006-164414 (PTL 2). The configuration of two electrothermal actuators for making a magnetic head element that performs a reading element and writing protrude with respect to the surface of a magnetic disk on which information is recorded is described in paragraphs 0042 to 0046 and FIGS. 5 to 7 of this publication. The two resistors are connected to two diodes having mutually opposite polarities in series, respectively, and circuits of these two systems are connected in parallel. Supply of currents to the resistors is performed via the two parallel connection points.

CITATION LIST

Patent Literature

[PTL 1] JP-A-2009-170014
[PTL 2] JP-A-2006-164414

SUMMARY OF INVENTION

Technical Problem

In the driving system of the electrothermal actuators described in PTL 1, two sets of drivers, that is, amplifiers are required to drive the pair of electrothermal actuators, and four wiring lines are required to energize each resistor. Since an electric circuit that drives the electrothermal actuators is provided in a stationary part, it is necessary to provide four pads on the end face of the minute magnetic head slider with limited area to perform electric connection. Moreover, switching means is required to drive the recording and reproducing element in both inward and outward directions of the track direction.

In the driving system of the electrothermal actuator described in PTL 2, the electrothermal actuators are used in order to control the protruding amount of the element, and are not designed to perform positioning in the track direction. Additionally, the two electrothermal actuators drive separate objects, respectively, and the two actuators do not cooperate with each other to position one object.

An object of the invention is to provide a mechanism that realizes the operation of linearly displacing, with respect to an input signal for controlling the position of a magnetic head by an actuator, without increasing the number of connection points.

Solution to Problem

The invention provides a positioning and driving system including a rotating magnetic disk; a magnetic head slider that floats above the surface of the magnetic disk and writes data to and reads data from a track provided on the magnetic disk; an actuator that positions the magnetic head slider in a radial direction of the magnetic disk; and an amplifier that supplies electrical power to the actuator in accordance with an input signal and performs a drive operation. In this positioning and driving system, with respect to a positioning device of the configuration in which a pair of resistors are formed integrally with a member on both sides of the object to be positioned, of the member on which the object to be positioned is mounted, and the object to be positioned is driven in both right and left directions using thermal displacement caused by energizing these resistors, provided is the configuration of an electrothermal actuator driving system that can obtain continuous displacement over the entire required operating range with respect to changes in an input voltage by using only one amplifier and that is incorporated into a feedback control system and is suitable for realizing high-speed and high-precision positioning.

The magnetic head slider is a magnetic head slider including a recording and reproducing element that writes and reads the data; a pair of heater elements that are arranged on both sides of the recording and reproducing element in a track width direction and generates heat by energization; and a member that is interposed between the recording and reproducing element and the heater element and expands and contracts according to heat generation of the heater element and cooling by heat dissipation.

A first wiring line that connects one heater element and a first diode in series and a second wiring line that connects the other heater element and a second diode in series are connected in parallel at both ends thereof to form two connection points so that conducting directions of the diodes are opposite to each other.

The amplifier is an amplifier having the capability of amplifying an input voltage so that voltages in both positive and negative directions are capable of being generated between two output terminals in accordance with an input signal.

The two output terminals of the amplifier are wire-connected to the two connection points, respectively, so that one heater element is energized to displace the recording and reproducing element in one direction of the track width direction when the amplifier has applied the positive voltage, and the other heater element is energized to displace the recording and reproducing element in a direction opposite to this direction when the amplifier has applied the voltage in the negative direction.

If another example is taken, in the first example, the amplifier is a first amplifier in which one of the output terminals is the ground and that has the capability of amplifying the input voltage so that the voltages in both the positive and negative directions are capable of being generated in the other terminal, the magnetic head positioning and driving device further includes a second amplifier in which one of the output terminals is the ground similarly, and an electrothermal actuator that is driven by the second amplifier and displaces the recording and reproducing element in a floating direction with respect to the magnetic disk, and a ground side of a connecting wire of the second amplifier that drives the electrothermal actuator and a ground side of a connecting wire of the first amplifier are made common so as to drive both actuators in the track width direction and in the floating direction by connection using three terminals.

If still another example is taken, in the first or second example, a drive circuit including the diodes is provided with current detecting means, and a current value detected by the current detecting means is fed back to an amplifier input so as to constitute a current control system.

Advantageous Effects of Invention

According to the invention, in the magnetic head positioning device of the configuration in which the magnetic head is driven in both right and left directions using the pair of electrothermal actuators arranged on both sides of the magnetic head, continuous displacement can be obtained over the entire required operating range with respect to changes in an input voltage by using only one amplifier. Thus, a magnetic head positioning and driving system that is incorporated into a feedback control system and realizes high-speed and high-precision positioning can be easily configured. As a result, the performance of various apparatuses that require a magnetic head positioning mechanism having high-response capability, such as a magnetic disk apparatus, can be improved.

DESCRIPTION OF EMBODIMENTS

Examples will be described below with reference to the drawings.

Example 1

Figure 2:
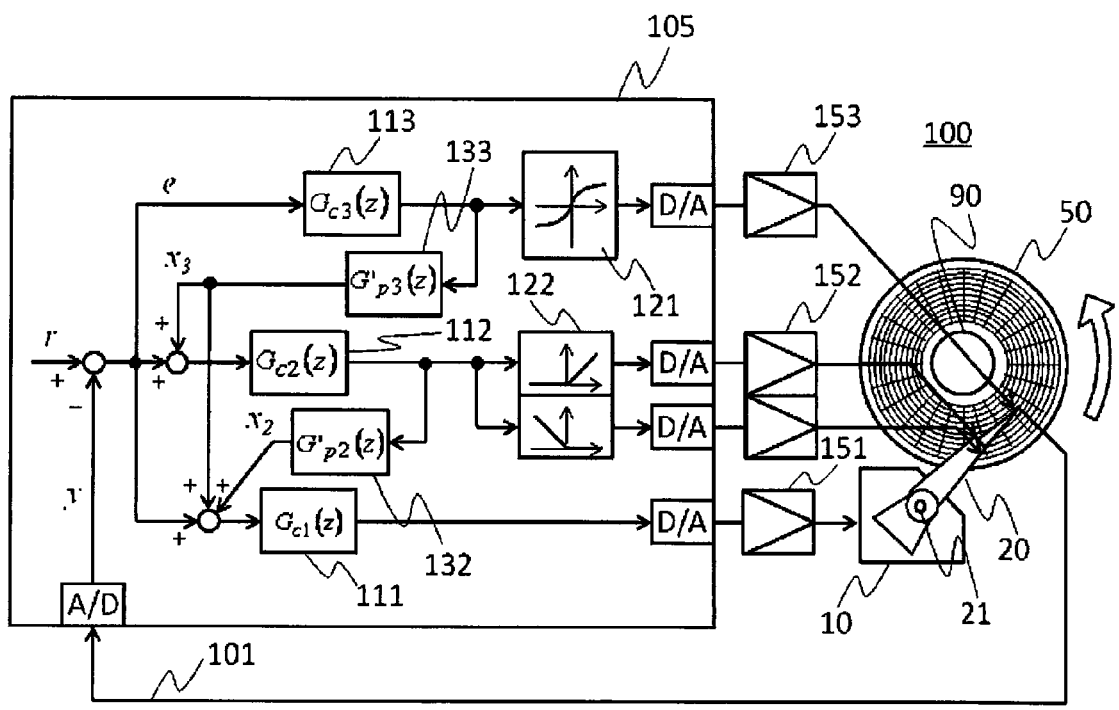
FIG. 2 is a block diagram showing an example of the configuration of a magnetic head position control system to which the invention is applied.

In the present example, an example of an apparatus 100 that makes a magnetic head of a magnetic disk apparatus follow a track will be described. FIG. 2 is a block diagram showing an example of the configuration of a magnetic head position control system to which the invention is applied. In FIG. 2, a number of tracks are provided in a concentric fashion on the surface of a magnetic disk 50 in order to record information, and a large number of servo patterns are provided in a radial fashion at equiangular intervals in order to detect the position of the magnetic head that performs writing of information. The magnetic disk 50 is driven by a spindle motor 90, and rotates at a constant angular velocity in the direction of an arrow shown on the right in the drawing.

The magnetic head is attached to a head stack assembly 20, and the head stack assembly 20 drives the magnetic head in the radial direction of the magnetic disk 50, and positions the magnetic head on a track to perform reading and writing of information. The servo patterns pass through the location of the magnetic head in a fixed cycle with the rotation of the magnetic disk, and the magnetic head reads a servo signal during this passage to perform position detection. This position signal is input to a controller 105, and position control of the magnetic head is performed. Here, the configuration of an actuator will be described before the contents of the control are described.

Figure 1:
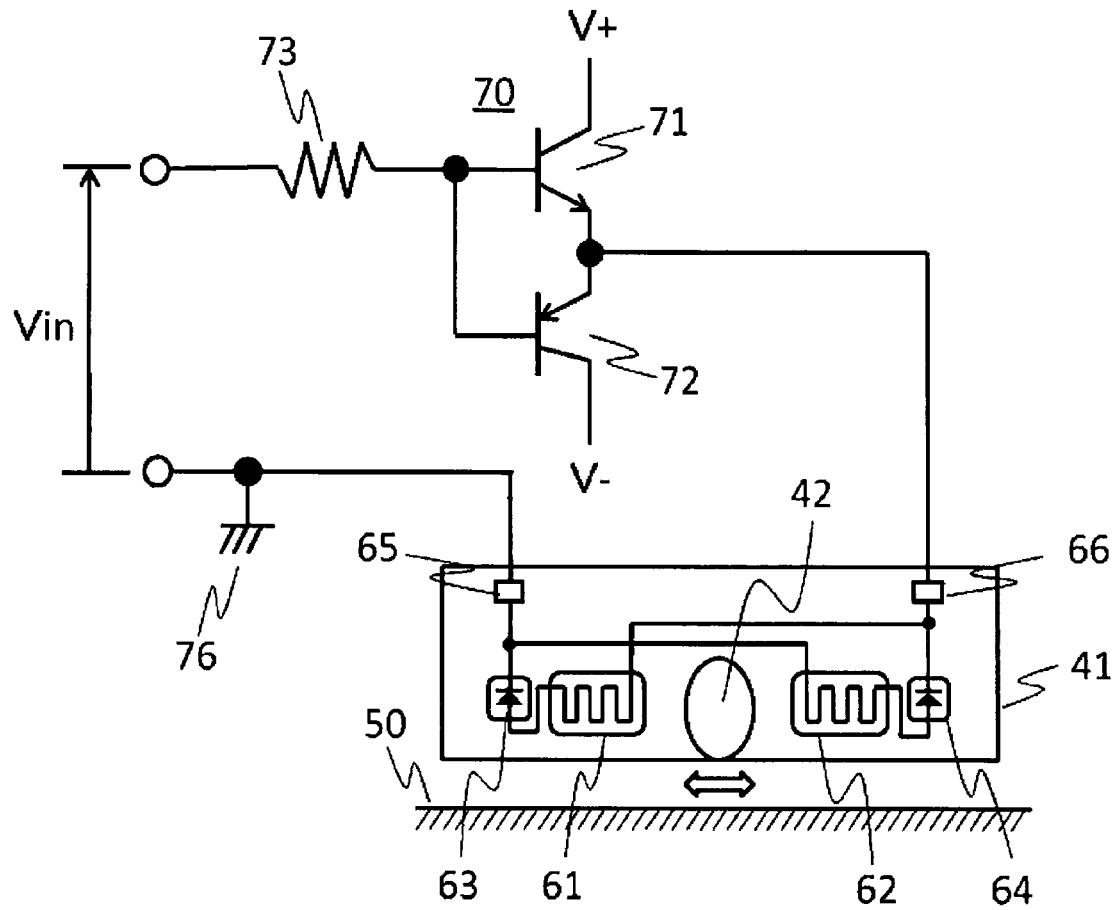
FIG. 1 is a side view of a rear end face of a head slider and a connection diagram of a drive circuit.
Figure 3:
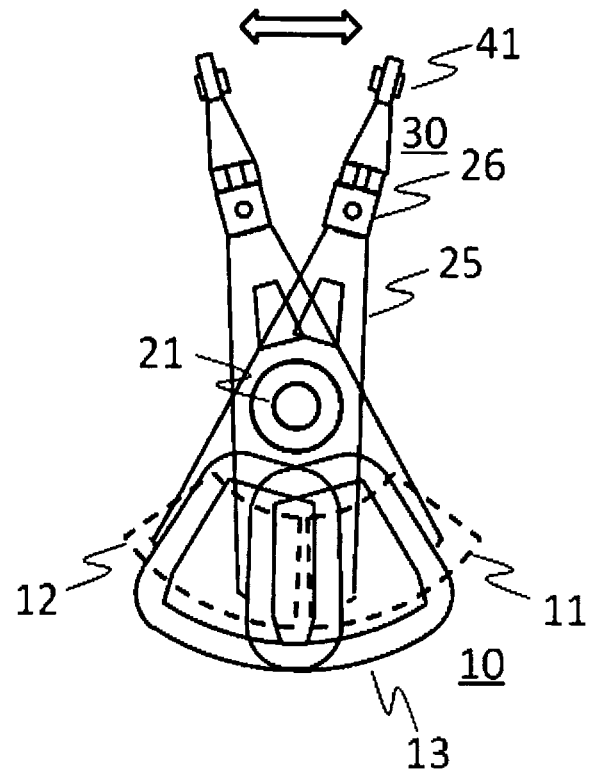
FIG. 3 is a plan view showing driving using a voice coil motor.
Figure 4:
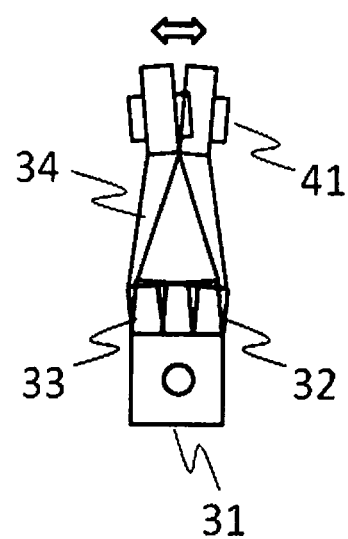
FIG. 4 is a plan view showing the configuration of a head suspension assembly.

FIGS. 3, 4, and 1 are views showing the configuration of the head stack assembly 20. FIG. 3 is a plan view showing driving using a voice coil motor that acts as a first-stage actuator. In FIG. 3, the head stack assembly 20 includes a voice coil motor 10 on the lower side in the drawing. The voice coil motor 10 swings the head stack assembly 20 via a pivot 21 as an axis by applying a current to an annular coil 13 placed in a magnetic field constituted by a permanent magnet 11 and a permanent magnet 12 Amount portion 26 is provided at the tip of a carriage 25 that has the coil 13 attached thereto and is supported by the pivot 21, and a head suspension assembly 30 is attached to the tip.

FIG. 4 is a plan view showing the configuration of the head suspension assembly 30 including a second-stage actuator. In FIG. 4, one end of each of a pair of piezoelectric elements 32 and 33 is connected to the tip of a base 31, and the other end of each of these piezoelectric elements is attached to a support spring 34. If a voltage such that the element on the right in the drawing elongates and the element on the left contracts is applied to these piezoelectric elements, the tip of the head suspension assembly 30 is displaced leftward. On the contrary, if a voltage such that the element on the left in the drawing elongates and the element on the right contracts is applied, the tip of the head suspension assembly 30 is displaced rightward. With this operation, a head slider 41 is also driven in the same direction, and is displaced in a direction that crosses the tracks.

FIG. 1 is a side view when the head slider 41 is viewed from the rear end face of the head slider 41 having a substantially rectangular parallelepiped shape, that is, from the upper side in FIGS. 3 and 4, and a connection diagram of a drive circuit. In FIG. 1, the head slider 41 floats above the magnetic disk 50 with an extremely narrow gap. A magnetic head 42 is provided at a central portion of the head slider 41, and performs recording or reproducing processing to the tracks provided on the surface of the magnetic disk 50.

Both a first resistor 61, and a second resistor 62 at a position symmetrical to the first resistor are provided in proximity to the magnetic head 42 with the magnetic head interposed therebetween beside the magnetic head. A first diode 63 and a second diode 64 are provided outside these resistors, and the anode of each of such diodes is connected to one end of the resistor beside the diode. The cathode of each diode is coupled to the other end of the resistor opposite to the diode, and the connection points of the cathodes connected to two pads (terminals or relay points) 65 and 66 that are relay points for making the electric connection between a slider portion and a control circuit.

An output stage 70 of an electrothermal actuator driving amplifier of the control circuit is constituted by a pair of transistors, the collector of an NPN-type transistor 71 is connected to a positive power source, the collector of a PNP-type transistor 72 is connected to a negative power source, the bases of both the transistors are connected to each other, and the emitters of both the transistors are connected to each other. The pad 66 is connected to the connection point between the emitters. The other pad 65 is connected to the ground side of the amplifier. A voltage driving signal Vin of the preceding stage is applied to the connection point between the bases via a resistor 73.

Through the above configuration, if the voltage driving signal Vin changes in a positive direction from 0 V, a base current flows to the NPN-type transistor 71, this transistor is turned on, and thus, a collector current flows. As a result, a current flows from a power source V+ via the pad 66, the resistor 61, the diode 63, and the pad 65 to a ground 76. The magnitude (that is, absolute value) of the flowing current is controlled depending on the magnitude of the voltage driving signal Vin, and the calorific value of the resistor 61 is controlled depending on the magnitude of the flowing current. If the material of the head slider in the vicinity of the resistor 61 expands thermally and locally according to the difference between the heat generation of the resistor 61 and the heat dissipation caused by the heat conduction of the head slider or the heat transfer of an air stream, the magnetic head 42 is pushed rightward in the drawing by the stress caused by the thermal expansion of this material. Thus, the magnetic head 42 is driven rightward in the drawing and is displaced in the direction that crosses the tracks.

Additionally, if the voltage driving signal Vin changes in a negative direction from 0 V, the base current flows to the PNP-type transistor 72, and this transistor is turned on. As a result, a current flows from the ground 76 via the pad 65, the resistor 62, the diode 64, and the pad 66 to a power source V−. In this case, since the material of the head slider in the vicinity of the resistor 62 expands thermally and locally by the heat generation of the resistor 62 caused by a current flowing via the diode 64, and the magnetic head 42 is pushed leftward in the drawing by the stress caused by the thermal expansion of this material, the magnetic head 42 is driven leftward in the drawing, and is displaced in the direction that crosses the tracks. Since the calorific value of a resistor becomes larger as the absolute value of the voltage driving signal Vi becomes larger, the amount of displacement in any directions becomes a larger amount of displacement with an increase in the absolute value of the voltage driving signal Vin. That is, if the voltage driving signal Vin changes continuously from a positive highest value to a negative lowest value, the magnetic head 42 is also continuously displaced from one end of a movable range to the other end thereof along with this. This is a characteristic that is preferable when the position control of the magnetic head 42 is performed, and is able to allow configuration of a feedback control system easily.

In addition, although an example in which the output stage of the driving amplifier 70 is constituted by a bipolar transistor is provided in the above description, an example in which the output stage is constituted by an MOS transistor may be provided. Additionally, the output stage of the driving amplifier 70 may be an H-bridge circuit.

In the electrothermal actuator, the heat generation w proportional to the square of a current i that flows to a resistor or the square of a voltage Vin that is applied to the resistor is generated. If the resistance value of a resistor is R, w is expressed by the following equation.

$$w = i^2 R \qquad \text{[Math. 1]}$$
$$= \frac{V_{in}^2}{R}$$

A displacement $X_3$ occurs with a first-order lag (the delay of response before a material is heated and expands from the start of the heat generation w) characteristic according to the heat generation w. If the transfer characteristic during this period is Laplace-transformed and expressed, the following equation is obtained. Here, the displacement is set to 0 at t=0.

$$X_3 = \frac{K_\theta}{1 + T_\theta s} W \qquad \text{[Math. 2]}$$

Here, $T_\theta$ is a time constant of a displacement response, and $K_\theta$ is a gain constant. Accordingly, the displacement $X_3$ is not linearly related to the current i or the applied voltage Vin, and linearly responds to the square of the current or the applied voltage. Additionally, in a case where there is a step input of the magnitude w, W=w/s is established (W is obtained by Laplace-transforming the constant w). Thus, if Math. 2 is inversely Laplace-transformed, a time change $X_3(t)$ of the displacement becomes $X_3(t)=K_\theta w(1-\exp(-t/T_\theta))$. Accordingly, after the voltage Vin is applied to a resistor, the response time corresponding to a predetermined displacement is determined by $T_\theta$.

Now, although all the three actuators provided in the head stack assembly cause a displacement in the direction in which the magnetic head 42 crosses the tracks, there are differences in the magnitude of the amount of displacement. That is, although the first-stage voice coil motor shown in FIG. 3 has a stroke with which the head can be moved onto all the tracks of the magnetic disk 50, the second-stage piezoelectric element actuator shown in FIG. 4 has only a stroke with which the head is moved by a width equivalent to several tracks, and the third-stage heat actuator shown in FIG. 1 has only a stroke equivalent to some percentage of the width of a recording track. On the other hand, as response frequency bands in a case where a feedback servo system is constituted using these actuators, the first-stage voice coil motor has about 1 kHz, the second-stage piezoelectric element actuator has about 2 kHz, and the third-stage heat actuator has about 3 kHz.

Although the variables of respective transfer functions are shown by Z transformation in FIG. 2, the variables are described by s in the text on the basis of Laplace transformation.

Referring back to FIG. 2, a control system that operates these three actuators in cooperation with each other and makes the magnetic head follow respective tracks provided on the magnetic disk 50 will be described. In FIG. 2, a position signal 101 decoded from information showing a track number recorded on a track of the magnetic disk 50 and a position within the track is fetched into the digital controller 105 via an A/D converter on the lower left in the drawing by a demodulator circuit that is not shown. The fetched position signal y is compared with and subtracted from a target position signal r, and a position error signal e (e=r−y, the negative feedback amount of the difference of the position signal y to the target position signal r) is created. This position error signal e is input to a third-stage control element 113 having a transfer function $G_{C3}$ (s), and is subjected to compensation operation processing, such as proportionality, integration, phase lead, or phase lag. That is, in the transfer function $G_{C3}$ (s), operation for improving response characteristics to the position error signal e is performed for the electrothermal actuator. On the other hand, this result is output from a D/A converter via a square root characteristic element 121 to be described below, is amplified by a third-stage amplifier 153, and is applied to the pad 66, whereby the third-stage heat actuator is displaced.

On the other hand, a third-stage displacement estimation value $X_3'$ is output through a third-stage displacement estimation element $G_{P3}'$ (s) 133. In the displacement estimation element $G_{P3}'$ (s) 133, the operation of obtaining the displacement estimation value $X_3'$ to the position error signal e by a predetermined model calculation is performed. The third-stage displacement estimation element $G_{P3}'$ (s) 133 expresses a transfer function before the third-stage heat actuator is displaced through the D/A converter and the third-stage amplifier 153 and the position signal 101 changes. The third-stage displacement estimation value $X_3'$ is respectively added to deviations e input to a second-stage control element $G_{C2}$ (s) 112 and a first-stage control element $G_{C1}$ (s) 111. In addition, in the present example, " ' " is given to a transfer element (transfer function) and a signal regarding the displacement estimation.

In the third-stage electrothermal actuator, as mentioned above, the heat generation W proportional to the square of the current i that flows to the resistor or the square of the voltage Vin that is applied to the resistor is generated. Accordingly, as a current or an applied voltage becomes a larger value, an increase in displacement that is larger relative to an increase in the same current or applied voltage occurs. If such characteristics are given, a problem occurs in that, when displacement is fed back to perform position control, the response characteristics may change according to the amount of displacement, and response may become delayed or unstable. Since the actuators and the circuits have symmetrical structure as shown in FIG. 1, the aforementioned nonlinear characteristics are generated symmetrically irrespective of the direction of the displacement. To cope with this, FIG. 2 shows an application example of the square root functional element 121 that applies a voltage to which – (minus) sign is given after an applied voltage on the positive side is pre-processed by the element 121 having square root characteristics to the voltage, and an applied voltage on the negative side is pre-processed by an element having square root characteristics to the absolute value of applied voltage. The square root functional element 121 has the characteristics of the following equation.

$$V_{in} = \begin{cases} K\sqrt{u} & (u \geq 0) \\ -K\sqrt{-u} & (u < 0) \end{cases} \quad \text{[Math. 3]}$$

Here, u is the input of this square root functional element, and is equivalent to an operation amount signal calculated by the feedback control system. K is a gain constant. Since the square root functional element 121 has the function of cancelling the above-mentioned square characteristics, the characteristics of a driving system become linear, and the effect that changes in the response characteristic according to the amount of displacement are suppressed is obtained. The transfer function $G'_{P3}$ (s) of the third-stage displacement estimation element 133 can be obtained by performing discretization processing of the transfer function of an electrothermal actuator driving system that is determined from the characteristics of the transfer function of Math. 2, the power consumption in the resistor of Math. 1, and the square root functional element of Math. 3.

The sum of the third-stage displacement estimation value $X_3'$ and a deviation e is input to the second-stage control element $G_{C2}$ (s) 112, and compensation operation processing, such as proportionality, integration, phase lead, or phase lag, is performed. That is, in the transfer function $G_{C2}$ (s), operation for improving response characteristics to the position error signal e is performed for the piezoelectric actuator.

On the other hand, this result may be decomposed into dual-system operation amount signals according to whether a sign is positive/negative by a positive/negative separative element 122, and these signals are output from the D/A converter, respectively, and are applied to the piezoelectric elements 32 and 33 through a dual-system second-stage amplifiers 152, thereby driving the piezoelectric actuator. On the other hand, a second-stage displacement estimation value $X_2'$ is output through a second-stage displacement estimation element $G_{P2}'$ (s) 132. The second-stage displacement estimation element $G_{P2}'$ (s) 132 is a differential equation model expressing a transfer function before the piezoelectric actuator is displaced through the D/A converter and the second-stage amplifier 152, the magnetic head mounted on the head slider is displaced, and the position signal 101 changes. The second-stage displacement estimation value $X_2'$ is added to the deviation e input to the first-stage control element $G_{C1}$ (s) 111. The transfer function $G_{P2}'$ (s) of the second-stage displacement estimation element 132 may be, for example, a proportional element using a constant that is determined from the relationship in which the relationship between an applied voltage and displacement to the piezoelectric actuator is linearized.

The sum of the third-stage displacement estimation value $X_3'$, the second-stage displacement estimation value $X_2'$, and the deviation e is input to the first-stage control element $G_{C1}$ (s) 111, and compensation operation processing, such as proportionality, integration, phase lead, or phase lag, is performed. That is, in the transfer function $G_{C1}$ (s), operation for improving response characteristics to the position error signal e is performed for the voice coil motor. This result is output from the D/A converter as an operation amount signal, and is applied to the coil of the voice coil motor 10 through a first-stage amplifier 151, and thereby, the voice coil motor 10 is driven.

If the length from the pivot 21 of the head stack assembly 20 shown in FIG. 3 to the piezoelectric element 32 or 33 shown in FIG. 4 is R, the fluctuation angle of the rotation of the position of the piezoelectric element 32 or 33 centered on the pivot 21 is $\theta_1$ (first-stage actuator), the length from the position of the piezoelectric element 32 or 33 shown in FIG. 4 to the head slider 41 is r (here, r<R), the fluctuation angle of the rotation of the head slider 41 with respect to a line segment that has the position of the piezoelectric element 32 or 33 as a rotation center and that passes through this rotation center and the pivot 21 is $\theta_2$ (second-stage actuator), and the fluctuation amount of the magnetic head 42 within the head slider 41 is $x_3$ (third-stage actuator), the fluctuation amount of the magnetic head 42 by the first-stage actuator is $(R+r)\theta_1$ ($|(R+r)\theta_1|<D_1$), the fluctuation amount of the magnetic head 42 by the second-stage actuator is $r\theta_2$ ($|r\theta_2|<D_2$), and the fluctuation amount of the magnetic head 42 by the third-stage actuator is $x_3$ ($|x_3|<D_3$) Thus, the fluctuation amount of the magnetic head 42 in the track width direction by the three actuators becomes $(R_+r)\theta_1+r\theta_2+x_3$. Here, the fluctuation angles $\theta_1$ and $\theta_2$ are sufficiently small, and $|\theta_1|\ll 1$ and $|\theta_2|\ll 1$ are established.

In the present example, since only one driving amplifier is required and only two pads are required for electric connection to the electrothermal actuator on the slider, there is an effect that it is easy to mount the electrothermal actuator on a minute slider.

When an extra displacement by the residual heat left behind in one resistor has occurred in the magnetic head after the heat generation w is turned on for one resistor in the electrothermal actuator, the magnetic head is displaced to a predetermined position, and the heat generation w is turned off, the control of turning on the heat generation w for the resistor on the opposite side by the action of the feedback control system shown in FIG. 2 and pushing back the magnetic head that has undergone extra displacement by the residual heat of one resistor is performed.

Example 2

Figure 5:
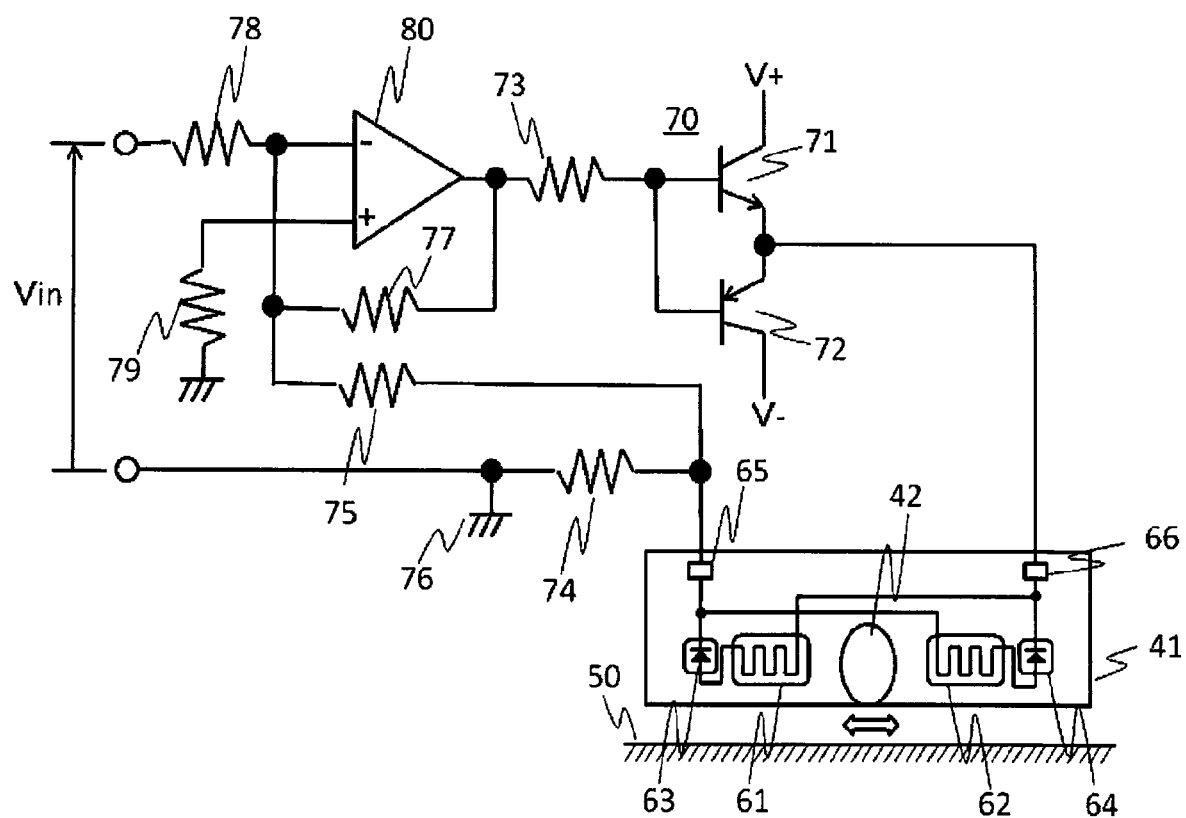
FIG. 5 is a side view of the rear end face of the head slider and a connection diagram of the drive circuit.

In the present example, another example of the apparatus 100 that makes the magnetic head of the magnetic disk apparatus follow a track similarly will be described. Description of portions having the same functions as Example 1 is omitted. FIG. 5 is a side view when the head slider 41 is viewed from the rear end face of the head slider 41, that is, from the upper side in FIGS. 3 and 4, and a connection diagram of a drive circuit. The configuration of the slider portion and the output stage 70 of the electrothermal actuator driving amplifier of the control circuit are the same as those of FIG. 1 of the aforementioned Example 1.

In the present example, a current detecting resistor 74 having a resistance value that is smaller by one order of magnitude or more as compared to the resistance value of the resistor 61 or 62 is provided between the ground 76 of the driving amplifier and the pad 65. The voltage of a terminal on the side connected to the pad 65 of the current detecting resistor has a value proportional to a current that flows to this resistor, that is, a current that flow to the resistor 61 or the resistor 62.

On the other hand, one end of the resistor 73 is connected to a connection point between the bases of the pair of transistors that constitute the output stage 70 of the driving amplifier, and the other end of this resistor is connected to the output of an operational amplifier 80. The operational amplifier 80 forms a well-known inverting amplifier circuit and includes a feedback resistor 77, a voltage proportional to the current that flows to the resistor 61 or the resistor 62 is applied to an input end of one input resistor 75 as described above, and the operation amount signal Vin is applied to an input end of the other input resistor 78.

In the circuit configured in this way, a current feedback system, which feeds back a current detection value and compares the current detection value with Vin, and applies a current to the resistor 61 or 62 according to a value obtained by amplifying the deviation between both the current detection value and Vin, is configured. Accordingly, if the operation amount signal Vin corresponding to a current to be applied is input, even if there is a factor such that an error is caused within the above loop, feedback can be exerted to suppress the influence and make the current value into a desired value.

Since the diodes 63 and 64 that have the function action of changing resistor according to the direction of a current in the present example have well-known forward voltage drop characteristics, if a certain degree of voltage is not applied, a current does not flow even in a forward direction. Although this may become a factor that makes the operation of the electrothermal actuator produce a dead band, in the present example, it is possible to suppress this dead band by the above feedback function. There is an effect that excellent linear driving characteristics can be obtained by this. In the configuration shown here, the control operation of the current control system becomes proportional control. However, proportional integral control or control accompanied by phase compensation may be applied.

Example 3

Figure 6:
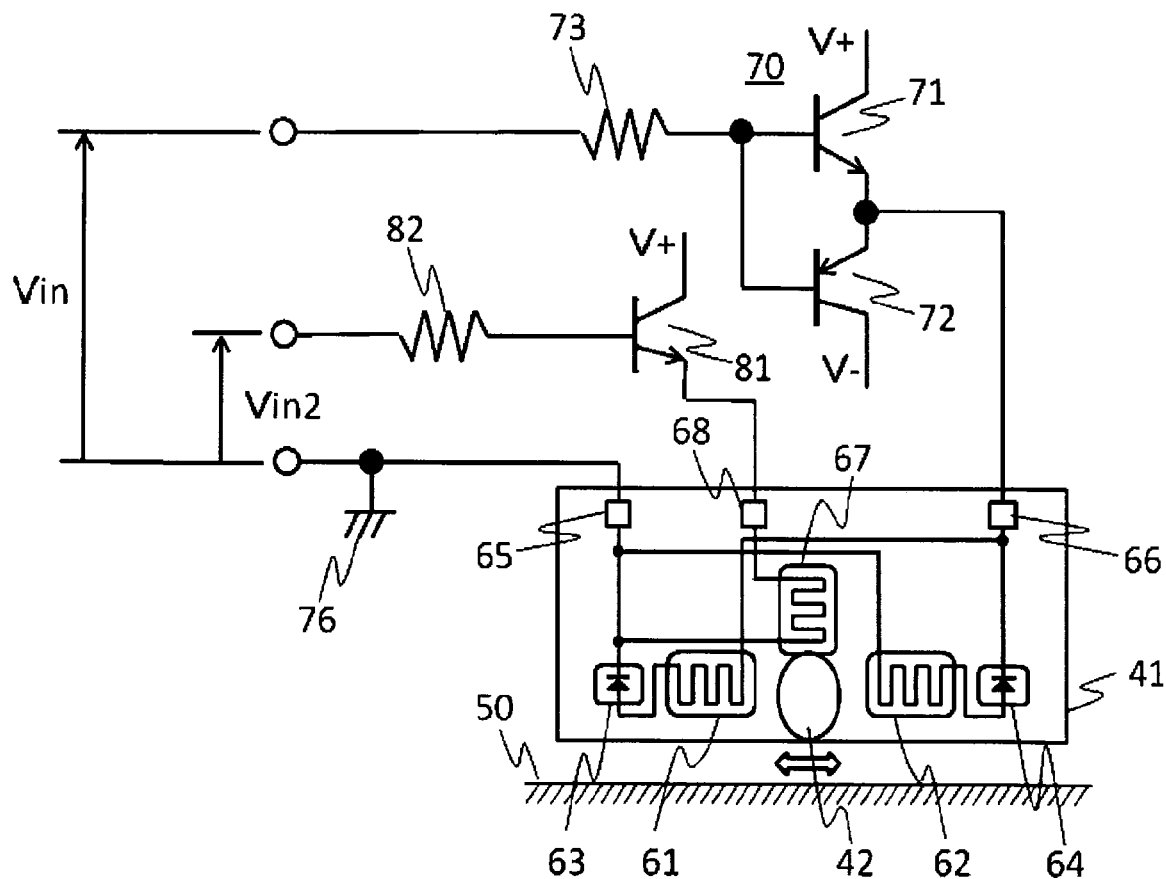
FIG. 6 is a side view of the rear end face of the head slider and a connection diagram of the drive circuit.

In the present example, an example in which not only the apparatus 100 that makes the magnetic head of the magnetic disk apparatus follow a track similarly performs track following operation in a tracking direction but operation in a floating direction will be described. FIG. 6 is a side view when the head slider 41 is viewed from the rear end face of the head slider 41, that is, from the upper side in FIGS. 3 and 4, and a connection diagram of a drive circuit. Description regarding the configuration in which the same reference numerals as those shown in FIG. 1 that is already described are given, and portions have the same functions is omitted.

In FIG. 6, a third resistor 67 is provided above the magnetic head 42, and one end of the resistor conductor 67 is connected to the pad 65, and is connected to the ground 76 of the driving amplifier. The other end of the resistor conductor 67 is connected to a third pad 68. The driving amplifier is provided with an NPN transistor 81, the collector terminal of the transistor is connected to a V+ power source that supplies a positive voltage, and the emitter terminal is connected to the third pad 68.

A voltage Vin2 is applied to the base terminal via a resistor 82. If the voltage Vin2 is a positive voltage, a current according to the magnitude of the voltage flows to the resistor 67, and if the voltage is 0 or a negative voltage, a current does not flow. The magnetic head 42 can be displaced according to the magnitude of this current to control the clearance between the magnetic head 42 and the magnetic disk 50. Vin2 is set to 0, for example, during seeking operation in which the magnetic head moves between the tracks, and the clearance is kept wide. On the other hand, while the magnetic head follows a predetermined track and writes data, a positive voltage is applied to Vin2 and the above interval becomes narrow. As a result, control is made so that the reliability of reading and writing of data is improved. In this configuration, the invention has the feature that can realize the displacement of the magnetic head in the tracking direction and the control of the displacement in the floating direction by connection using three pads.

REFERENCE SIGNS LIST

10: VOICE COIL MOTOR
11: PERMANENT MAGNET
12: PERMANENT MAGNET
13: COIL
20: HEAD STACK ASSEMBLY
21: PIVOT
25: CARRIAGE
26: MOUNT PORTION
30: HEAD SUSPENSION ASSEMBLY
31: BASE
32: PIEZOELECTRIC ELEMENT
33: PIEZOELECTRIC ELEMENT
34: SUPPORT SPRING

41: HEAD SLIDER
42: MAGNETIC HEAD
50: MAGNETIC DISK
61: RESISTOR
62: RESISTOR
63: DIODE
64: DIODE
65: PAD
66: PAD
67: RESISTOR
68: PAD
70: DRIVING AMPLIFIER
71: NPN TRANSISTOR
72: PNP TRANSISTOR
73: RESISTOR
74: RESISTOR
75: RESISTOR
76: GROUND
77: RESISTOR
78: RESISTOR
79: RESISTOR
80: OPERATIONAL AMPLIFIER
90: SPINDLE MOTOR.
100: APPARATUS THAT MAKES MAGNETIC HEAD OF MAGNETIC DISK APPARATUS FOLLOW TRACK
101: POSITION SIGNAL
105: DIGITAL CONTROLLER
111: FIRST-STAGE CONTROL ELEMENT
112: SECOND-STAGE CONTROL ELEMENT
113: THIRD-STAGE CONTROL ELEMENT
121: SQUARE ROOT FUNCTIONAL ELEMENT
122: POSITIVE/NEGATIVE SEPARATIVE ELEMENT
132: SECOND-STAGE DISPLACEMENT ESTIMATION ELEMENT
133: THIRD-STAGE DISPLACEMENT ESTIMATION ELEMENT
151: FIRST-STAGE AMPLIFIER
152: SECOND-STAGE AMPLIFIER
153: THIRD-STAGE AMPLIFIER

The invention claimed is:

1. A magnetic head positioning and driving device in a positioning and driving system comprising:
a rotating magnetic disk;
a magnetic head slider that floats above the surface of the magnetic disk and writes data to and reads data from a track provided on the magnetic disk;
an actuator that positions the magnetic head slider in a radial direction of the magnetic disk; and
an amplifier that supplies electrical power to the actuator in accordance with an input signal and performs a drive operation, wherein the magnetic head slider is a magnetic head slider including a recording and reproducing element that writes and reads the data;
a pair of heater elements that are arranged on both sides of the recording and reproducing element in a track width direction and generates heat by energization; and a member that is interposed between the recording and reproducing element and the heater element and expands and contracts according to cooling by heat generation and heat dissipation of the heater element;
wherein a first wiring line that connects one heater element and a first diode in series and a second wiring line that connects the other heater element and a second diode in series are connected in parallel at both ends thereof to form two connection points so that conducting directions of the diodes are opposite to each other,
wherein the amplifier is an amplifier having the capability of amplifying an input voltage so that voltages in both positive and negative directions are capable of being generated between two output terminals in accordance with an input signal, and
wherein the two output terminals of the amplifier are wire-connected to the two connection points, respectively, so that one heater element is energized to displace the recording and reproducing element in one direction of the track width direction when the amplifier has applied the positive voltage, and the other heater element is energized to displace the recording and reproducing element in a direction opposite to the direction when the amplifier has applied the voltage in the negative direction.

2. The magnetic head positioning and driving device according to claim 1,
wherein the amplifier is a first amplifier in which one of the output terminals is the ground and that has the capability of amplifying the input voltage so that the voltages in both the positive and negative directions are capable of being generated in the other terminal,
wherein the magnetic head positioning and driving device further includes: a second amplifier in which one of the output terminals is the ground similarly, and an electrothermal actuator that is driven by the second amplifier and displaces the recording and reproducing element in a floating direction with respect to the magnetic disk, and
wherein a ground side of a connecting wire of the second amplifier that drives the electrothermal actuator and a ground side of a connecting wire of the first amplifier are made common so as to drive both actuators in the track width direction and in the floating direction by connection using three terminals.

3. The magnetic head positioning and driving device according to claim 2,
wherein a drive circuit including the diodes is provided with current detecting means, and a current value detected by the current detecting means is fed back to an amplifier input so as to constitute a current control system.

4. The magnetic head positioning and driving device according to claim 1,
wherein a drive circuit including the diodes is provided with current detecting means, and a current value detected by the current detecting means is fed back to an amplifier input so as to constitute a current control system.

5. The magnetic head positioning and driving device according to claim 1,
wherein when an extra displacement by the residual heat left behind in the one heater element has occurred in the magnetic head after energization of one of the pair of heater elements is turned on to displace the magnetic head to a predetermined position, and then the energization is turned off, the control of turning on the energization to the other of the pair of heater elements by feeding back the extra displacement and pushing back the magnetic head that has undergone extra displacement by the residual heat of the one heater element is performed.

* * * * *